INVENTORS.
Richard B. Sheek &
BY Vernon T. Stack,
Paul & Paul
ATTORNEYS.

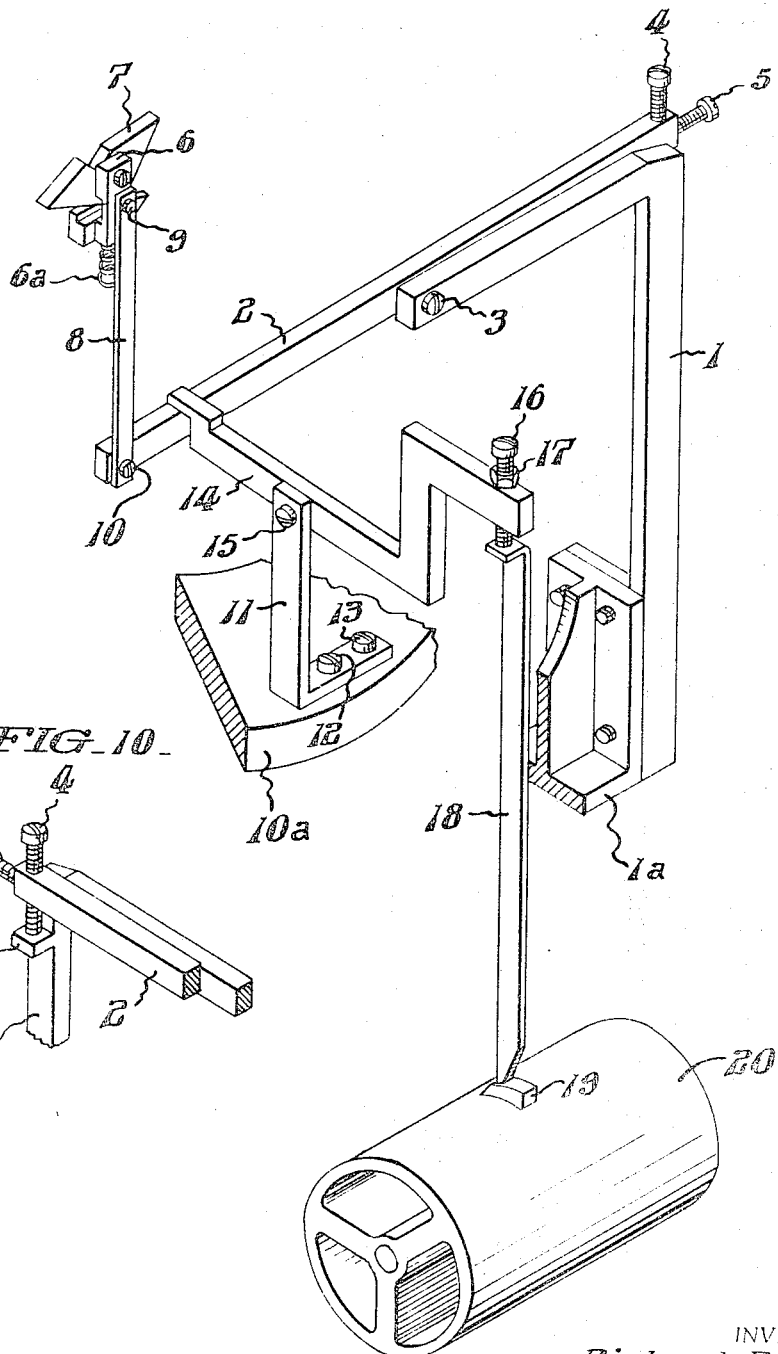
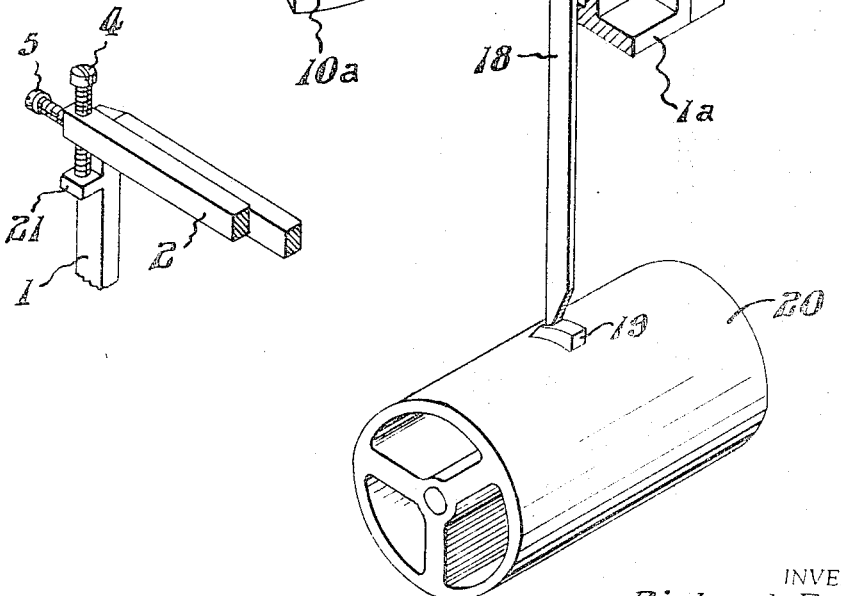

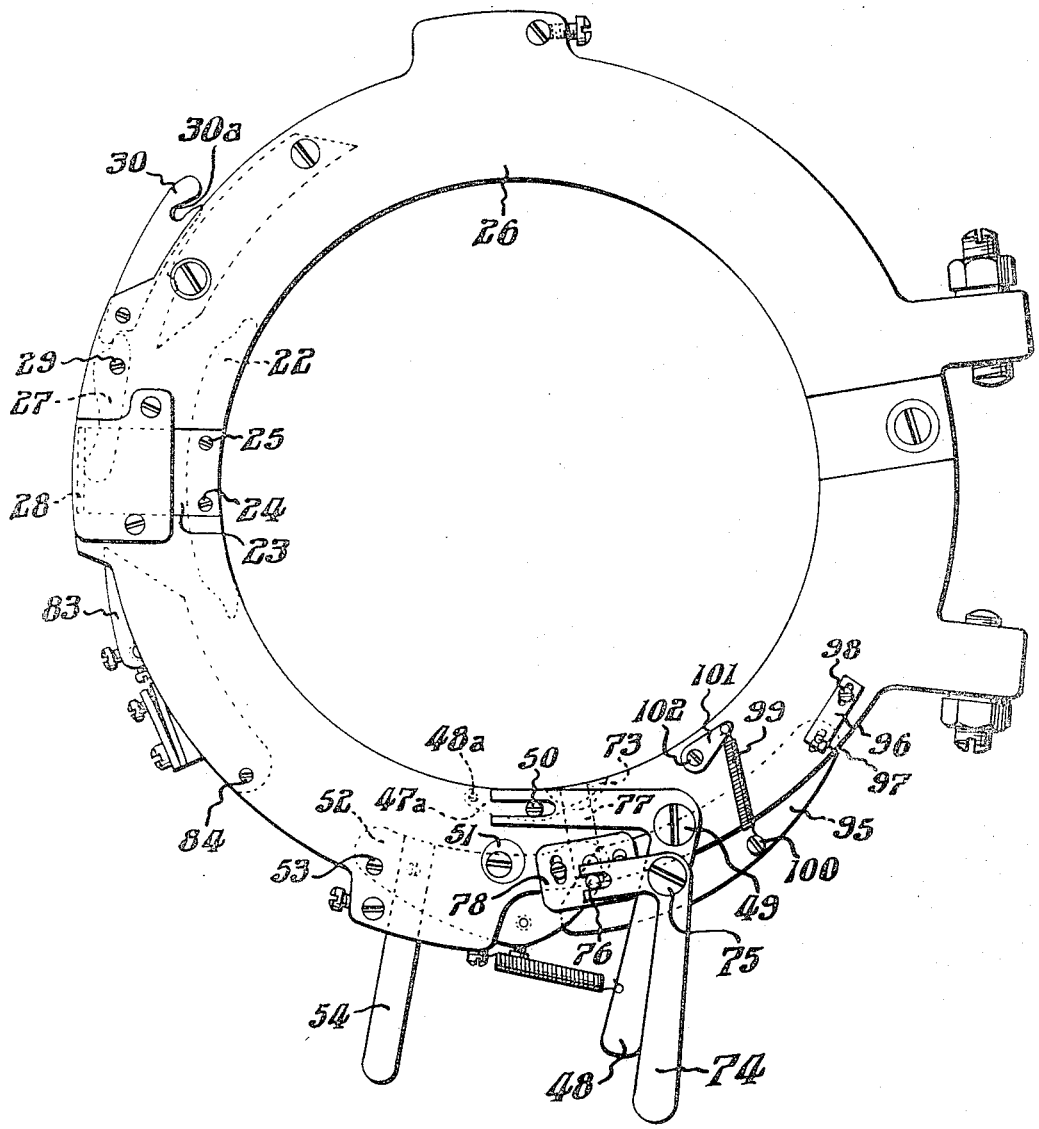

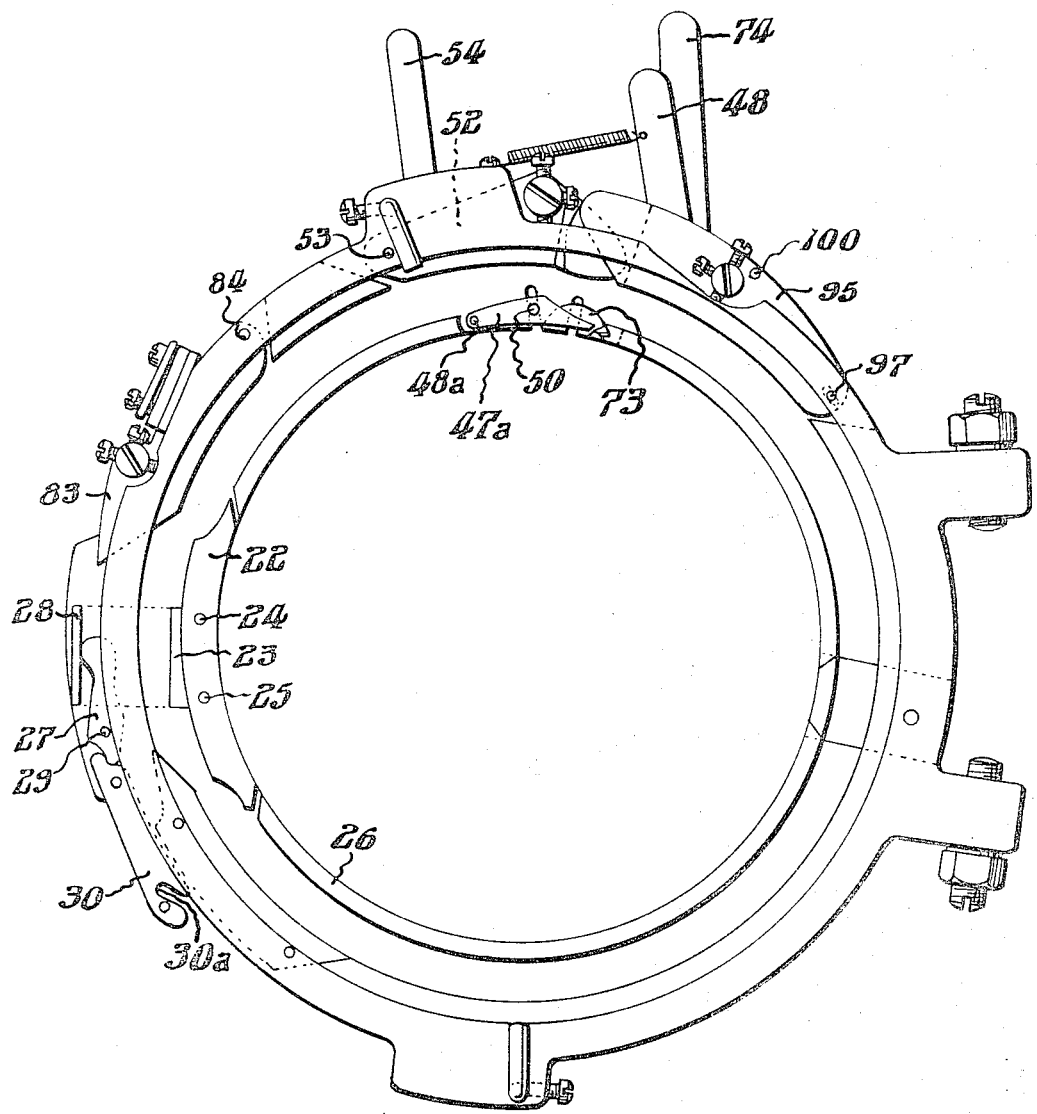

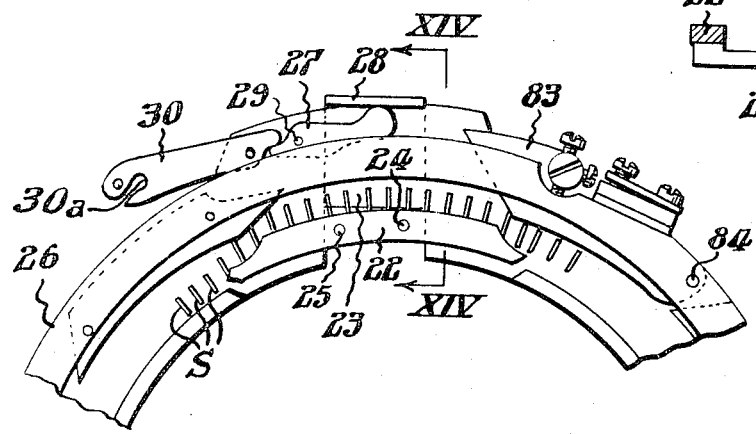
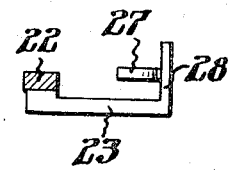
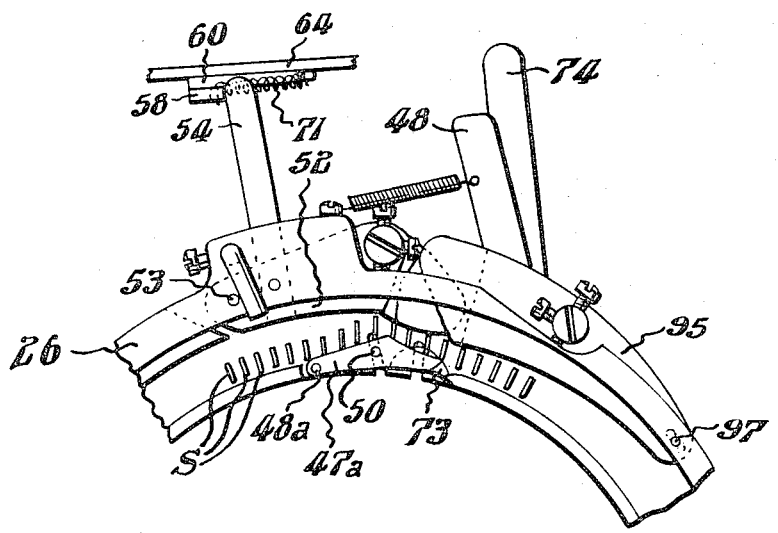

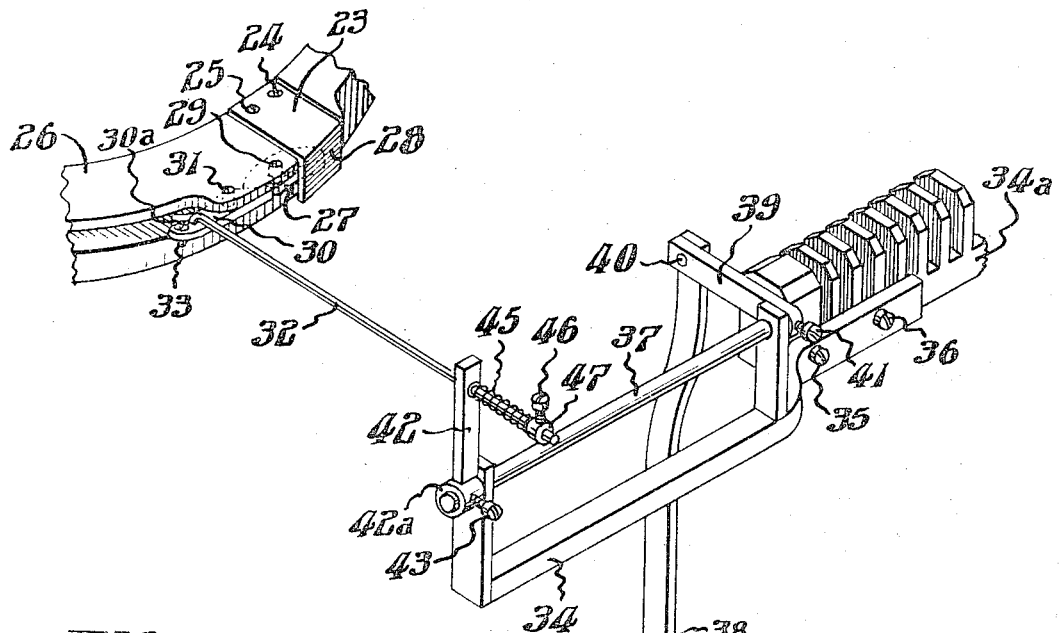
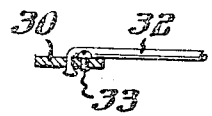

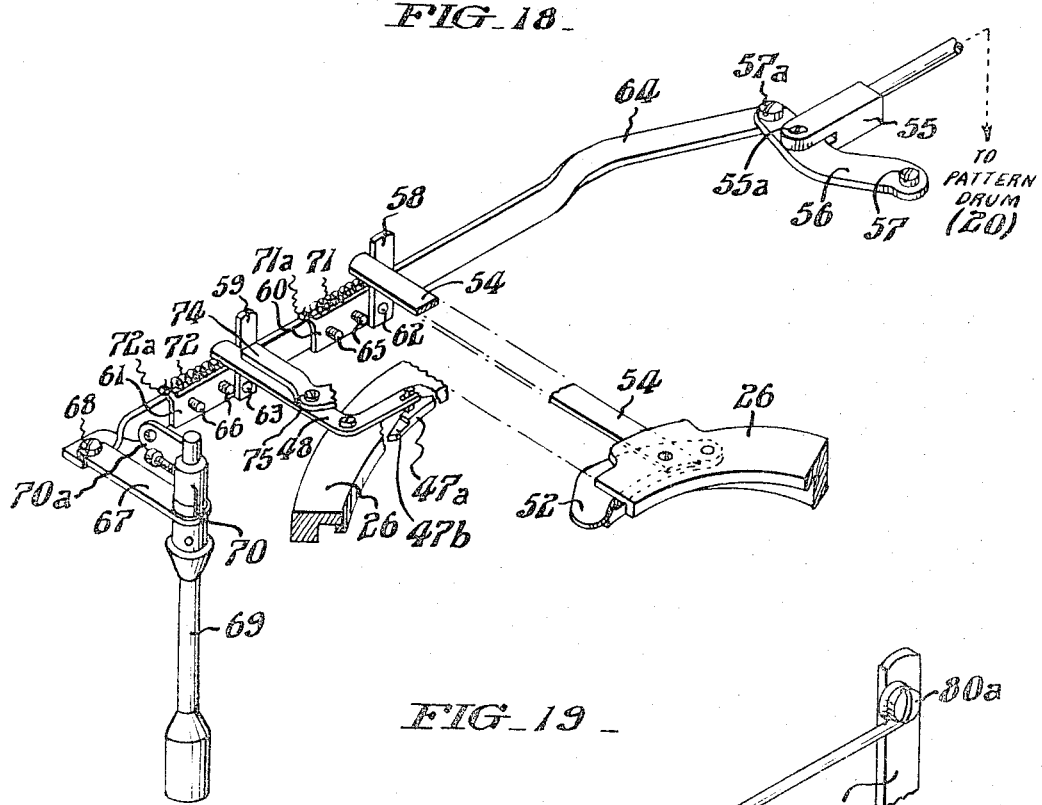

Sept. 19, 1967  R. B. SHEEK ETAL  3,342,042
APPARATUS FOR KNITTING RUN-RESISTANT HOSIERY
Original Filed Nov. 16, 1962  13 Sheets-Sheet 11
FIG_23_
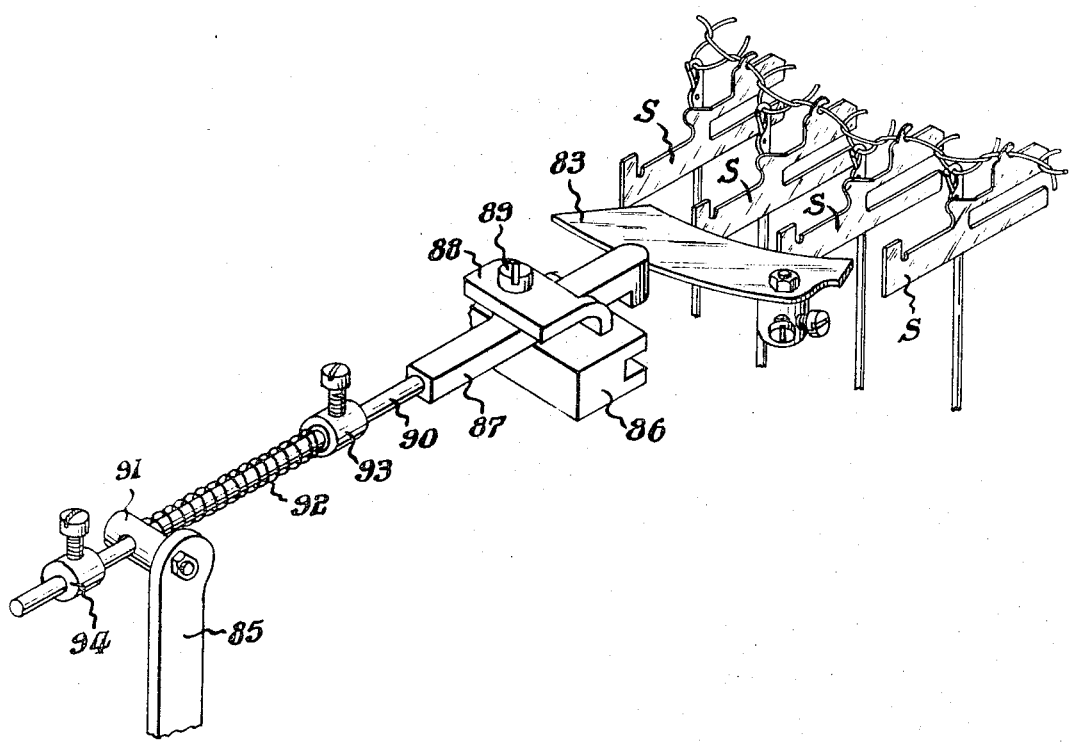
INVENTORS.
Richard B. Sheek &
BY Vernon T. Stack,
Paul & Paul
ATTORNEYS.

Sept. 19, 1967  R. B. SHEEK ET AL  3,342,042
APPARATUS FOR KNITTING RUN-RESISTANT HOSIERY
Original Filed Nov. 16, 1962  13 Sheets-Sheet 12

INVENTORS.
Richard B. Sheek &
BY Vernon T. Stack,

Paul & Paul
ATTORNEYS.

INVENTORS.
Richard B. Sheek &
BY Vernon T. Stack,
Paul & Paul
ATTORNEYS.

United States Patent Office 3,342,042
Patented Sept. 19, 1967

3,342,042
APPARATUS FOR KNITTING RUN-RESISTANT HOSIERY
Richard B. Sheek and Vernon T. Stack, Winston-Salem, N.C., assignors to Hanes Corporation, a corporation of North Carolina
Original application Nov. 16, 1962, Ser. No. 238,190. Divided and this application Dec. 23, 1964, Ser. No. 420,605
2 Claims. (Cl. 66—108)

ABSTRACT OF THE DISCLOSURE

A circular knitting machine is provided with sinker control cams operable for moving the sinkers outwardly to transfer previously knit stitches from behind the sinker nebs to in front of the sinker nebs, and for immediately reinserting the sinkers for behind-the-neb knitting. The machine is also provided with a sinker control cam operable for preventing the formation of eyelets at the interlacement when a yarn is inserted or removed.

---

This application is a division of our copending application Ser. No. 238,190, filed Nov. 16, 1962, now abandoned.

This invention relates generally to run-resistant fabrics and particularly to improments in such fabrics and in methods and apparatus for producing the same.

An important object of the invention is to provide an improved method of producing a seamless stocking of such fabric without introducing successive courses of plain stitches in the instep or successive wales of plain stitches in the boot.

Another object of the invention is to provide mechanism for producing such a stocking in a two-feed knitting machine.

Other objects of the invention will become apparent when the folowing description is read with reference to the accompanying drawings, in which:

FIGURES 9 and 10 are fragmentary perspective views showing mechanism for controlling the main feed stitch cam;

Figure 20:
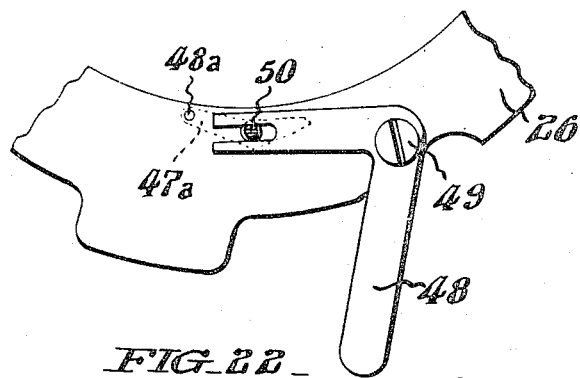
Figure 22:
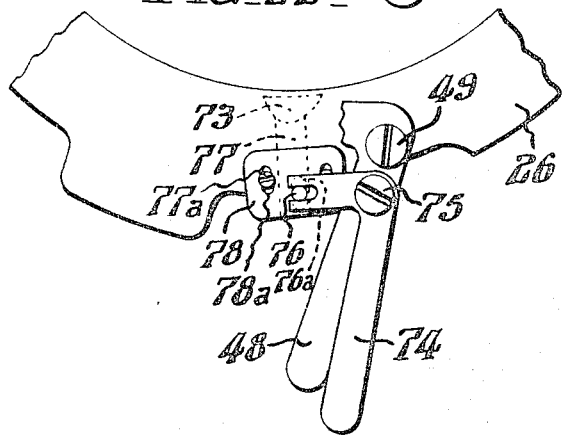
Figure 21:
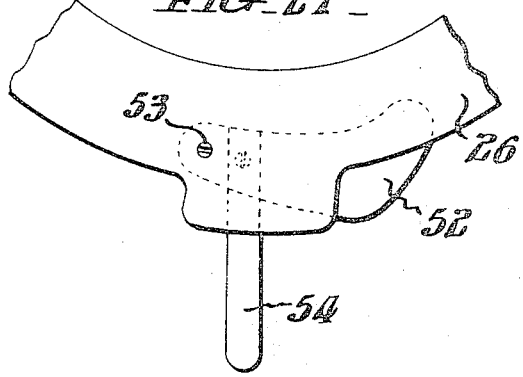
Figure 24:
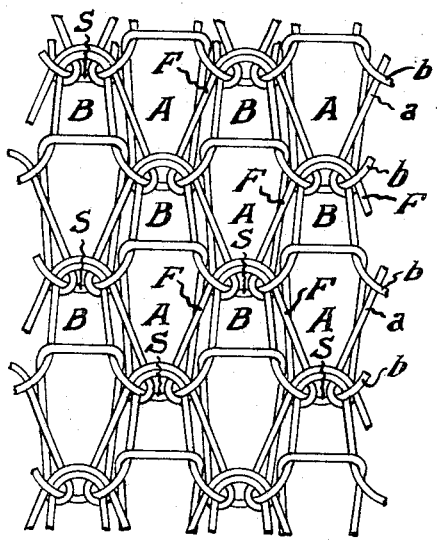
Figure 25:
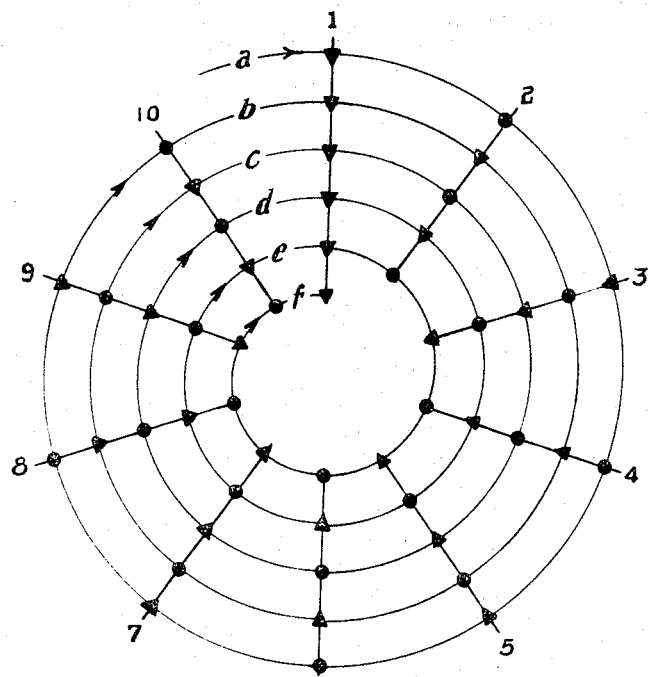
Figure 26:
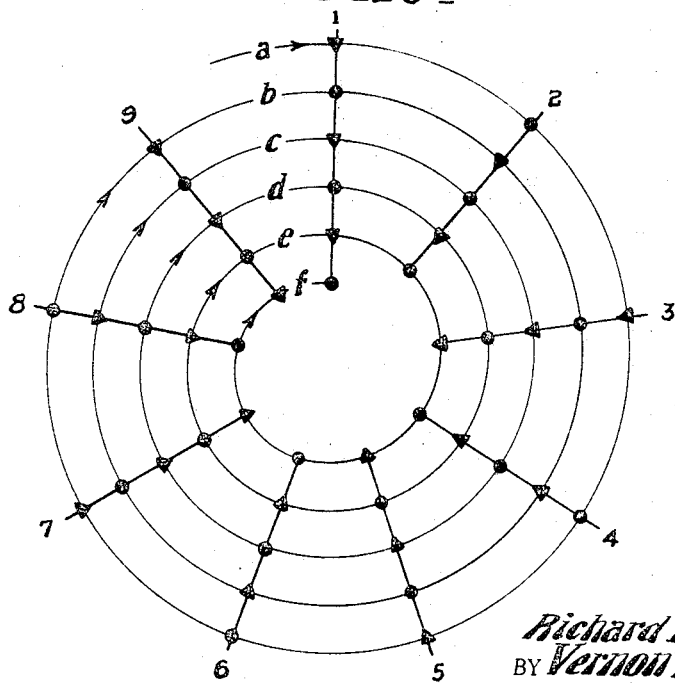

FIGURES 11 and 12 respectively are plan and bottom views of the sinker cap showing an arrangement of cams;

FIGURES 13 and 14 are fragmentary bottom views illustrating the path traveled by sinker butts;

FIGURE 14 is a section on line XIV—XIV of FIGURE 13;

FIGURE 16 is a perspective view showing mechanism for controlling the center cam;

FIGURE 17 is a section disclosing certain details;

FIGURE 18 is a perspective view showing mechanism for controlling the sinker control and auxiliary sinker pullout cams;

FIGURE 19 is a perspective view showing mechanism for controlling the interlacement cam;

FIGURE 20 is a view showing the auxiliary sinker pullout cam in position to withdraw the sinkers and shed the stitches;

FIGURE 21 is a view showing the sinker control cam;

FIGURE 22 is a view showing the interlacement cam;

FIGURE 23 is a view showing the knockover cam and mechanism for operating the same;

FIGURE 24 is a view of the run-resistant fabric, as viewed from the inside;

FIGURE 25 illustrates diagrammatically how a pattern fault develops with an even number of needle wales; and FIGURE 26 illustrates diagrammatically how the pattern fault is eliminated.

Figure 1:
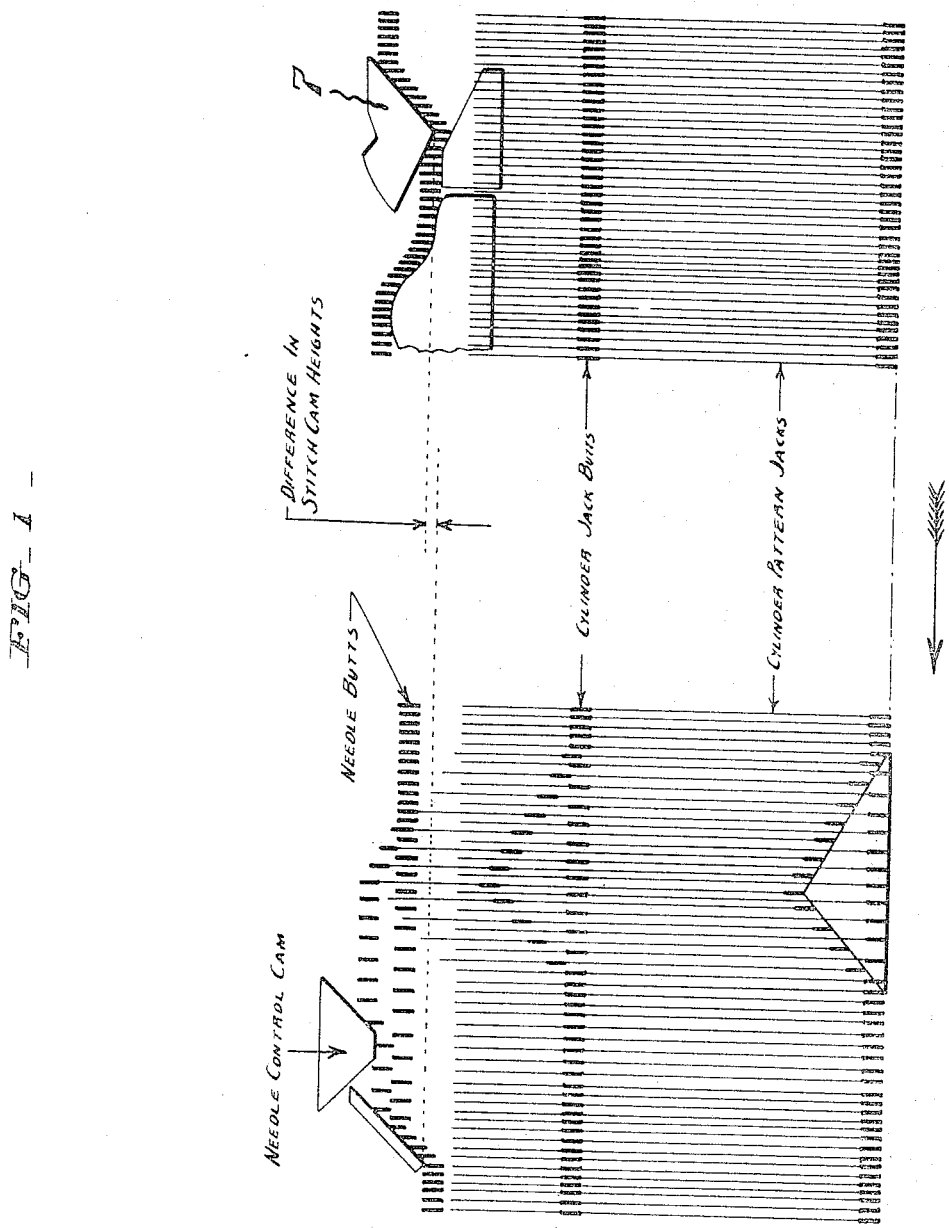
FIGURE 1 is a developed view indicating the jack, needle and cam arrangement of a circular knitting machine constructed in accordance with the invention.
Figure 2:
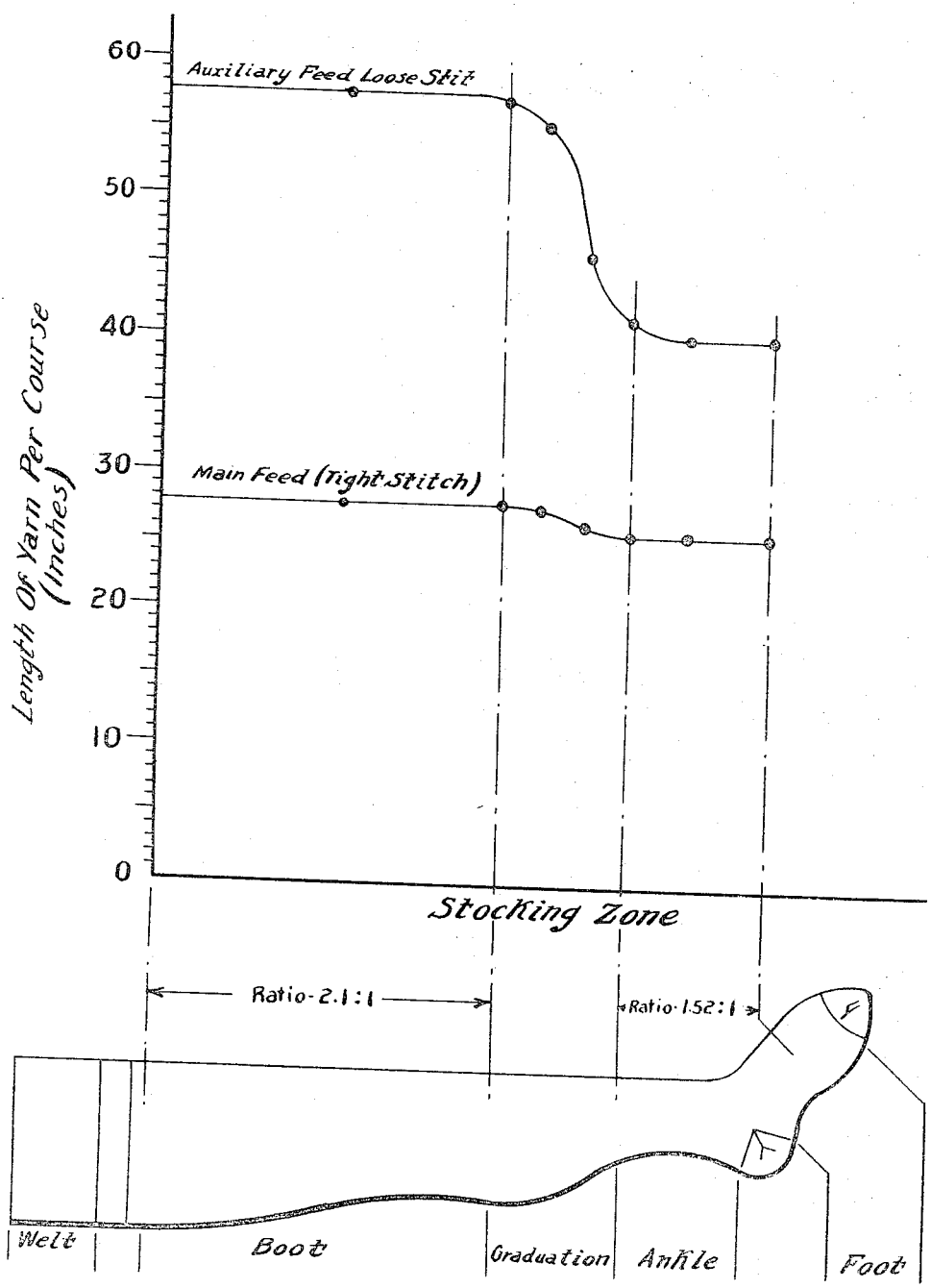
FIGURE 2 illustrates diagrammatically how the ratio of yarn length changes throughout a stocking knit in accordance with the invention.

A stocking made in accordance with the method and by the mechanism of the invention involves the run-resistant fabric shown in FIGURE 24, which consists of courses $b$ alternating with courses $a$. In the course $b$ the thread length is only approximately 45 to 70 percent of the thread length in the course $a$, as indicated in FIGURE 2. The course $b$ consists of tuck stitches B alternating with locking stitches S, while the course $a$ consists of stitches A alternating with tuck loops F. The tuck loops F have substantially the same length as the stitches A. The locking of the stitches A in the fabric structure is achieved by the omission of the stitch A in alternate wales of the course $a$ and by extending the stitches B of the preceding course $b$ so that the stitches B extend over two courses, obtaining the necessary supply of yarn from the neighboring stitches S so that these stitches S are contracted to such an extent as to form locking stitches, which hold the stitches A.

The holding of stitches A by means of the locking stitches S is more or less influenced by the difference between the thread and stitch lengths in the courses $a$ and $b$ and because stitches B are formed as tuck stitches and elongated, so contracting the stitches S to a greater or lesser degree.

By using a mesh pattern with one needle step, knitting from course $a$ to course $b$, stitches A, stitches B and locking stitches S are formed sequentially in each wale, so that in every needle wale, stitches A, tuck stitches B, tuck loops F and locking stitches S exist.

The length of the thread in course $b$ without tuck loops may advantageously be from 60% to 65% of the length of the thread in the course $a$ with tuck loops, but this percentage can be reduced to as little as 45%. The length of the thread in the course $b$ without tuck loops in relation to the course $a$ with tuck loops must not be so great as to prevent the fabric from having the run-resistant property and must not be so small as to lead to overtensioning or breaking of the thread in manufacture.

Basically, the courses $b$ without tuck loops must be short enough relative to courses $a$ with tuck loops so that courses $b$ without tuck loops take all the strain that can be placed on the fabric in any direction, i.e., courses $a$ with tuck loops must be so loose that the threads making up these courses are never tensioned, irrespective of how the fabric is tensioned. Thus, the greater the tension, the more the locking stitches S of the courses $b$ are pulled tight, in consequence of which the tuck loops are unable to pull out of the plain stitches, and runs are prevented.

A Scott and Williams KN–III circular knitting machine, modified in the manner now to be described, may be used to produce a stocking made of the run-resistant fabric.

A needle cylinder which accommodates an odd number of needles, for example, 409 needles, is used.

Referring particularly to FIGURES 9 and 10, a stitch cam differential arm 1 replaces the conventional cylinder hold-down (S & W No. 105519). A rocker arm 2 is fastened to differential arm 1 by a pivot screw 3. Rocker arm 2 is connected to a stitch cam key 6 by operating arm 8 and pivot screws 9 and 10 respectively at opposite ends of the operating arm 8. The main stitch cam, designated 7, is fastened to stitch cam key 6 in the usual manner. At one end of rocker arm 2 is an adjusting screw 4 which engages a stop 21 carried by differential arm 1. The adjusting screw 4 is locked in a selected position by the screw 5. A compression spring 6a exerts an upward force on stitch cam 7, in consequence of which the rocker arm 2 is biased clockwise about pivot 3 for engagement of screw 4 with the stop 21. The distance from pivot screw 10 to pivot screw 3 is approximately the same as that from adjusting screw 4 to pivot screw 3.

Referring particularly to FIGURE 9, mounted upon the lower bed plate, designated 10a, is a bracket 11 secured by screws 12 and 13. An actuating lever 14 is pivoted intermediate its ends to the bracket 11, as by screw 15. One end portion of the lever 14 extends over the rockable arm 2, while the opposite end portion extends over the upper end portion of a thrust bar 18. Threaded through the latter end portion of the lever 14 is an adjusting screw 16 upon which is threaded a lock nut 17. The lower end portion of the thrust bar 18 is suitably formed for engagement with a cam 19 mounted upon the usual pattern drum 20.

Referring particularly to FIGURES 11 to 14, the main feed center cam, designated 22, is affixed to a member 23 by screws 24 and 25. The member 23 is slidably received by the sinker cap 26, and its movement is controlled by a lever 27 operating against a lip 28 on slide 23.

Referring particularly to FIGURE 16, lever 27 pivots about a screw 29, and the angular movement thereof is controlled by another lever 30, which pivots about a screw 31. One end portion of the lever 30 is slotted, as at 30a, to accommodate one end portion of a rod 32, turned downwardly and flared, as shown in FIGURE 17. A screw 33 serves to retain the turned down end portion of rod 32 in the slot 30a. The opposite end portion of the rod 32 extends freely through an arm 42. Affixed to the end of the rod 32, as by a screw 46, is a collar 47, and fitted over the rod 32, between the collar 47 and the arm 42 is a compression spring 45. The arm 42 depends from the rod 32, and the lower end portion thereof is affixed to a rod 37 by a collar 42a and screw 43. Opposite end portions of the rod 37 are journalled in laterally spaced arms of a bracket 34, which is affixed by screws 35 and 36 to the usual pivot block, designated 34a. Affixed to the free end portion of the rod 37, as by a screw 41, is an arm 39. Pivoted to the free end portion of arm 39, as at 40, is the upper end portion of a thrust rod 38. The lower end portion of the thrust rod 38 is formed for coaction with a cam 44 mounted upon the pattern drum 20.

Referring particularly to FIGURES 11, 12, 15, 20 and 21, the auxiliary sinker pullout cam, designated 47a, is pivoted in the sinker cap 26, as by screw 48a, in the usual manner. An arm 48, pivoted in the sinker cap, as by a screw 49, is provided with a forked end portion which engages a screw 50 carried by the cam 47a. Thus the arm 48 controls the cam 47a. An eccentric, designated 51, affords an adjustable stop to locate cam 47a in the desired position. The sinker control cam, designated 52, is pivoted in the sinker cap 26, as by screw 53, in the usual manner. A lever 54 affixed to the cam serves to operate the same. The arm 48 and lever 54 are controlled by standard S & W KN-III Wide Welt Attachment parts connected thereto in the manner now to be described.

Referring particularly to FIGURE 18, controlled by the pattern drum 20 is a rod 55 pivotally connected, as at 55a, intermediate the ends of a link 56. One end portion of the link 56 is pivoted to the machine, as by a screw 57, while the opposite end portion is pivoted, as by a screw 57a, to one end portion of a link 64. Connected to the other end portion of the link 64, as by a pivot screw 68, is one end portion of a link 67. The other end portion of the link 67 is pivotally connected to the upper end portion of a post 69 and held in place by a collar 70. Adjustably affixed to the link 64, as by screws 65 working in slots (not shown), is a bracket 60, and pivoted to the bracket, as at 62, is an arm 58, which is biased counterclockwise by a tension spring 71 anchored to the bracket, as at 71a. Arm 58 is adapted for engagement with lever 54. Also adjustably affixed to the link 64, as by screws 66 working in slots (not shown), is a bracket 61, and pivoted to the bracket, as at 63, is an arm 59, which is biased counterclockwise by a tension spring 72 anchored to the bracket, as at 72a. Arm 59 is adapted for engagement with arm 48.

Referring particularly to FIGURES 11, 19 and 22, the interlacement cam 73 is mounted upon a member 77 slidable in the sinker cap 26. An arm 74, pivoted on the arm 48, as at 75, is provided with a forked end portion which engages a pin 76 carried by the slide 77. The pin 76 extends freely through an elongated opening 76a in a plate 78, which is adjustably secured in position by screws 77a extending through elongated openings 78a.

Referring particularly to FIGURE 18, it will be noted that the upper surface of cam 47a is recessed to form a part 47b which extends under the cam 73, as shown in FIGURES 12 and 15. Thus the working edges of both cams are disposed to engage the sinker butts S.

Referring particularly to FIGURE 19, the collar 70 has an extension 70a. One end portion of a rod 80 extends freely through the extension 70a, while the other end portion is pivotally connected, as at 80a, to the upper end portion of a thrust bar 82. This thrust bar is a standard part for the S & W Behind-the-Neb Knitting Attachment. Affixed to the rod 80, as by a screw 81, is a collar 79 adapted for engagement with the arm 74 whereby to control the cam 73.

Referring particularly to FIGURES 11 and 12, the S & W main feed knockover cam is replaced with a knockover cam, designated 83, pivoted, as by screw 84, in the sinker cap 26. Now referring particularly to FIGURE 23, an operating lever 85 and a block 86 are S & W Behind-the-Neb Attachment parts. A plunger 87 works between the block 86 and bracket 88, the latter being secured to the block 86 by a screw 89. Affixed to one end portion of the plunger 87 is a rod 90. The opposite end portion of the rod 90 extends freely through a stud 91 affixed to the operating lever 85. Fitted over the free end portion of the rod 90 is a collar 94, and fitted over the rod 90, between the stud 91 and a collar 93, is a compression spring 92. The nose of the plunger 87 is adapted for engagement with the cam 83.

Referring particularly to FIGURES 11, 12 and 15, the S & W auxiliary feed knockover cam is replaced with a knockover cam, designated 95, pivoted, as by a pin 97, in a block 96 adjustably fixed to the sinker cap 26 by a screw 98 extending through an elongated opening. Cam 95 is biased inwardly by a tension spring 99 anchored to screw 100 on cam 95 and an element 101 secured by screw 102 to the sinker cap 26.

In the operation of the knitting machine, at the main feed, a relatively tight stitch is formed on all needles with behind-the-neb kniting (FIGURE 4), the main feed stitch cam 7 being set just low enough at this point to allow the previous stitch to be cast off the needle. Alternate needles are then cleared, i.e., raised until the needle latch is clear of the formed stitch, before reaching the auxiliary feed. These alternate needles are designated x, while the intervening needles are desingated y (FIGURE 5). The sinkers, designated S, are withdrawn before reaching the auxiliary feed, and the stitches are transferred from behind the sinker neb to in front of the sinker neb (FIGURE 6). Immediately after withdrawal of the sinkers, they are re-inserted to a position for behind-the-neb knitting at the auxiliary feed.

Figure 7:
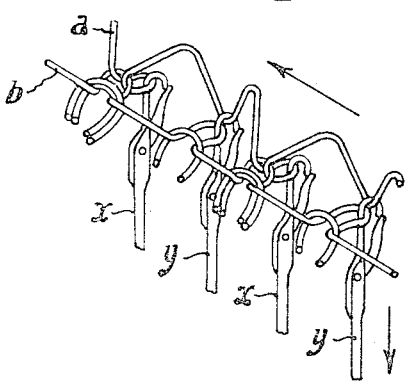
Figure 8:
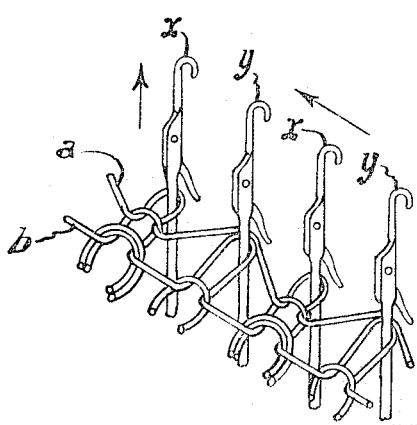

At the auxiliary feed, a relatively loose plain stitch is formed on needles x and a relatively loose tuck loop is formed on needles y (FIGURE 7). Thus, as the needles pass the auxiliary feed, each of the needles x has a loose plain stitch around its shank, and each of the needles y has both a loose tuck stitch and a loose tuck loop around its shank (FIGURE 8). All needles are cleared before reaching the main feed, but the sinkers are not withdrawn for transferring the stitches from behind the neb to in front or under the neb. In the next following course, the intervening needles y, instead of the alternate needles x, are cleared after passing the main feed. Thus the relatively loose plain stitch is formed on needles y, and the relatively loose tuck loop is formed on needles x. The procedure described is repeated throughout the knitting of the run-resistant fabric.

Figure 3:
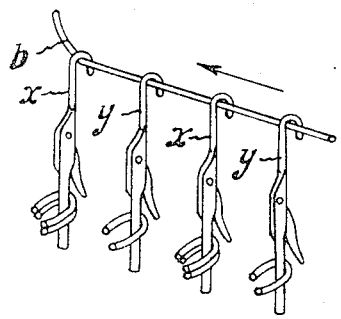
FIGURES 3 to 8 illustrate progressive steps in the knitting of the run-resistant fabric.
Figure 4:
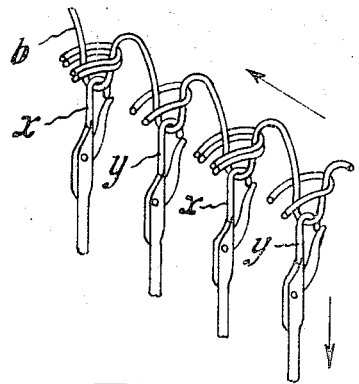
Figure 5:
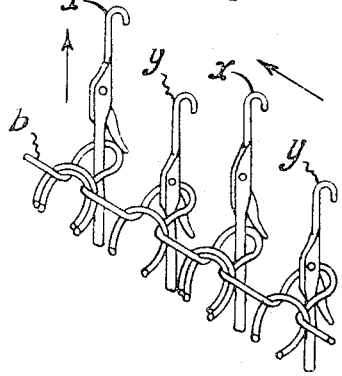
Figure 6:
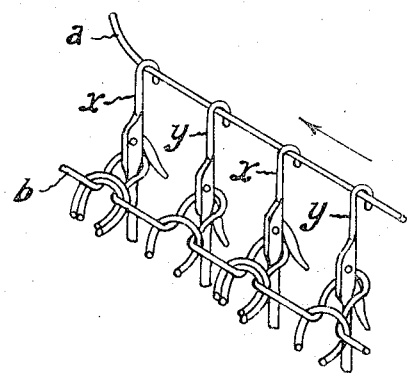

FIGURES 3–8 illustrate the stitch formation. In FIGURE 3 all needles have been raised and have drawn yarn b under the hooks of the needles at the main feed. The main feed stitch, which is the tight stitch, is shown in FIGURE 4 formed on all the needles. FIGURE 5 shows the needles x raised to clear height before reaching the auxiliary feed. At the auxiliary feed, see FIGURE 6, all needes draw yarn a under their hooks. FIGURE 7 shows a loose plain stitch formed on needles x, and a loose tuck loop formed on needles y, at the auxiliary feed. All needles are at clear height in FIGURE 8, prior to the main feed. The steps outlined are now repeated in the next following course, but with the needles stepped one wale, as indicated hereinbefore.

The two-feed knititng of the run-resistant fabric can be done with the yarns either behind the nebs or under the nebs of the sinkers provided the individual stitches are of a length sufficient so that, in knocking over, the sinkers may move inwardly without placing undue strain on the stitches and breaking them. In the knitting of the larger or looser portions of the stocking, such as the upper part of the boot, stitches can be formed on both feeds of a length sufficient to guard against breaking during the knocking over process. In the knitting of the smaller or tighter portions of the stocking, however, such as the ankle and foot, the stitches formed are so small that knitting preferably takes place behind the nebs of the sinkers to guard against breaking the stitches. Knitting behind the neb at the main feed allows the formation of tighten stitches.

It would be possible, and in some machines simpler, to reverse the feeds and do the tuck looping at the main feed. However, in this event, three courses of plain stitches would appear across the instep because the last course prior to the heel is made at the auxiliary feed, which would be knitting plain stitches, and the first course coming off the heel is made at the main feed, where plain stitches are necessarily made in this first course because the needles have all been previously cleared.

Since a tight and loose stitch combination is required to produce the run-resistant fabric, it follows that there is a preferred ratio of stitch size between the loose and tight stitches. This ratio is determined by comparing the length of yarn a used in a loose stitch course with the length of yarn b used in a tight stitch course. It will be noted from FIGURE 2 that the preferred ratio is 2.1 to 1 in the boot portion and 1.52 to 1 in the ankle and foot portions. This ratio is gradually decreased during stocking graduation. By varying the ratio in the different stocking parts, a better fitting stocking results.

As the cylinder and cylinder tube move downwardly during graduation to form smaller stitches, stitch cam differential arm 1 also moves downwardly because it is secured to the usual S & W cylinder hold-down bracket, designated 1a. Adjusting screw 4 permits manual setting of stitch cam 7. Needle action and spring 6a exert an upward force on stitch cam 7, keeping the screw 4 down on the stop 21. As differential arm 1 and screw 3 move downwardly with the cylinder, stitch cam 7 also moves downwardly.

The welt, heel and toe of the stocking, which are plain knit, require a looser stitch at the main feed and hence a lower setting of the main feed stitch cam 7. As the knitting of one of these stocking parts is approached, the pattern drum 20 brings cam 19 into contact with the lower end of thrust bar 18. Thus the latter is raised, and actuating lever 14 is pivoted about screw 15, whereupon the rocker arm 2 is pivoted about screw 3, against the influence of the needles and the spring 6a. As a consequence, stitch cam 7 is lowered to the desired position, selected by manipulating screw 16.

During the knitting of the run-resistant fabric, center cam 22 is positioned inwardly, as shown in FIGURES 11 and 12, in order to prevent shedding the stitch, i.e., transferring the stitch from behind the sinker neb to in front of the sinker neb at this point, and to knit the main feed yarn behind the neb. When knitting plain fabric, center cam 22 is positioned outwardly in order to withdraw the sinkers to knit in front of the neb, as shown in FIGURE 13.

As the knitting of the welt, heel or toe approaches, the pattern drum 20 brings cam 44 into contact with the lower end portion of thrust bar 38, and the latter is raised. Thus, through arm 39, rod 37 is rotated, causing arm 42 to rock against the influence of spring 45. This causes rod 32 to shift axially and pivot the lever 30 about the screw 31, whereupon the lever 27 pivots about the screw 29 and moves the slide 23 and the center cam 22 outwardly. Spring 45 functions to eliminate binding in the linkage when slide 23 is in its extreme outward position, which is controlled by a suitable stop (not shown). After the plain knit part of the stocking is completed, the pattern drum 20 moves the cam 44 from under the thrust bar 38, and the linkage returns to its initial condition, allowing the sinkers and sinker spring band (not shown) to move center cam 22 inwardly to its position for knitting the run-resistant fabric.

The sinkers are withdrawn or pulled out just before reaching the auxiliary feed, thereby to transfer the previous stitches from behind the sinker neb to in front of the sinker neb. Then the sinkers are immediately reinserted for behind-the-neb knitting. The foregoing is accomplished by sinker control cam 52, the nose of which is shaped so that the outside edges of the sinker butts come into contact with the sinker control cam 52 immediately after the auxiliary sinker pullout cam 47a has withdrawn the sinkers to their outermost position, as in FIGURE 15. The sinkers are thus reinserted to the behind-the-neb position as they follow the contour of sinker control cam 52.

In this connection, as the rod 55 is moved by the pattern drum 20 and the intervening linkage (not shown) toward post 69, arms 58 and 59 engage lever 54 and arm 48 respectively. Thus the sinker control cam 52 is moved inwardly and the auxiliary pullout cam 47a is moved outwardly. The springs 71 and 72 function to eliminate binding when the cams 52 and 47a reach the limit of movement.

On the insertion and removal of a yarn at the auxiliary feed, an eyelet is formed at the interlacement unless the yarn end is laid in front of the sinker neb rather than behind it. To avoid these eyelets, the sinkers must be withdraw by interlacement cam 73 at each auxiliary yarn insertion and removal. Consequently, when rod 80 is moved toward collar 70, collar 79 engages lever 74 and moves cam 73 to the desired position, which is held for a very short time after yarn removal or insertion. Then the sinkers and sinker band return the cam 73 to its initial position. It is preferred that at least twenty sinkers be retracted.

When interlacement cam 73 acts on the inside edges of the sinker butts and forces them outwardly, the outside edges of the sinker butts necessarily are forced against sinker control cam 52. If cam 52 were fixed in position, the sinker butts could not pass between interlacement cam 73 and sinker control cam 52. The sinker control cam 52, however, is pivoted in the sinker control cap, and as it is moved outwardly by the sinkers, lever 54 rocks arm 58 about its pivot 62 against the influence of spring 71.

The knockover cam 83 is positioned inwardly during knitting of the run-resistant fabric and outwardly during knitting of the plain welt, heel and toe. In this connection, when lever 85 is moved by the pattern drum and intervening linkage, stud 91 compresses the spring 92 against the collar 93 and the rod 90 and plunger 87 shift axially to move the cam 83 inwardly for knitting the run-resistant fabric.

At the welt, heel and toe, lever 85 is moved in the opposite direction and contacts collar 94. Thus plunger 87 is withdrawn, and the sinkers return the knockover cam 83 to its outward position.

As the knitting progresses through the graduation to the ankle and tighter stitches are successively formed, the inward movement of the sinker at the knockover point must become progressively less or an excessive amount of pressure will be applied to the stitches previously knit and transferred from behind to in front of the neb. The spring 92 functions to avoid this undue pressure. As a greater force outwardly is applied to the sinkers by the smaller stitches, cam 83 is forced outward and the force transmitted to spring 92, which absorbs the movement by compressing to a smaller length. Standard knockover cams normally are fixed in position, and no compensating feature is provided.

The spring 99 relieves any undue pressure by the knockover cam 95 on the sinkers, and consequently on the stitches, at the auxiliary feed.

Referring paticularly to FIGURE 25, several courses of knitting are designated *a* to *e*, respectively, several wales of stitches are designated 1 to 10, respectively, and plain stitches and tuck loops are designated by circles and triangles, respectively. Since the number of needle wales is even, a pattern fault develops in wale 1, as shown. This fault is eliminated by using an odd number of needle wales, as illustrated particularly in FIGURE 26, where nine instead of ten needle wales are shown.

It will be understood, of course, that the present invention, as described and shown, is susceptible to various changes and modifications which may be made without any departure from the general principles or real spirit of the invention. Accordingly, it is intended to claim the present invention broadly, as well as specifically, as indicated in the appended claims.

What is claimed is:

1. In combination with a circular knitting machine comprising a needle cylinder, sinkers carried by said cylinder, a sinker control cap, and main and auxiliary feeds, a pair of cams mounted upon said cap for pivotal movement cross-axially of said cylinder and cap and selectively positionable for passage of the butts of said sinkers freely therebetween and for providing a path of travel for said butts whereby said sinkers are moved as they approach said auxiliary feed first outwardly to transfer stitches from behind to in front of the nebs of said sinkers and then immediately inwardly again, first controlled means operable for actuating said cams and yieldably securing the same in said position for providing said path of travel for said butts, a third sinker cam mounted upon said cap for rectilinear movement cross-axially of said cylinder and cap and selectively positionable for urging said butts outwardly whereby said sinkers are moved outwardly for knitting in front of the nebs of said sinkers, and second controlled means operating in predetermined timed relation to said first controlled means and operable for actuating said third cam against the influence of said first controlled means.

2. In combination with a circular knitting machine comprising a needle cylinder, sinkers carried by said cylinder, a sinker control cap, and main and auxiliary feeds, sinker control and sinker pullout cams mounted upon said cap for pivotal movement cross-axially of said cylinder and cap and selectively positionable for passage of the butts of said sinkers freely therebetween and for providing a path of travel for said butts whereby said sinkers are moved as they approach said auxiliary feed first outwardly to transfer stitches from behind to in front of the nebs of said sinkers and then immediately inwardly again, first controlled means operable for actuating said cams and yieldably securing the same in said position for providing said path of travel for said butts, an interlacement cam mounted upon said cap for rectilinear movement cross-axially of said cylinder and cap and selectively positionable for urging successive groups of said butts outwardly whereby said sinkers are moved outwardly for knitting in front of the nebs of said sinkers, and second controlled means operating in predetermined timed relation to said first controlled means and operable for actuating said interlacement cam against the influence of said sinker control cam.

References Cited

UNITED STATES PATENTS

| | | | |
|---|---|---|---|
| 1,281,933 | 10/1918 | Fisher | 66—108 |
| 1,641,101 | 8/1927 | Scott | 66—108 X |
| 1,787,010 | 12/1930 | McAdams | 66—108 X |
| 1,797,435 | 3/1931 | Miller | 66—108 X |
| 2,524,578 | 10/1950 | St. Pierre et al. | 66—54 |
| 2,529,181 | 11/1950 | Page | 66—108 |
| 2,531,073 | 11/1950 | Miller | 66—108 |
| 2,582,465 | 1/1952 | St. Pierre | 66—108 |
| 2,727,374 | 12/1955 | Page | 66—108 |
| 2,823,529 | 2/1958 | St. Pierre et al. | 66—54 |
| 3,094,854 | 6/1963 | Fregeolle | 66—108 |
| 3,173,277 | 3/1965 | Fregeolle | 66—108 |

FOREIGN PATENTS 124,265   5/1947   Australia.

MERVIN STEIN, *Primary Examiner.*

W. REYNOLDS, *Examiner.*